(12) United States Patent
Morgan (10) Patent No.: US 10,956,587 B2
(45) Date of Patent: Mar. 23, 2021

(54) VEHICLE COMPUTER SECURITY

(71) Applicant: INTERNATIONAL BUSINESS MACHINES CORPORATION, Armonk, NY (US)

(72) Inventor: William D. Morgan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 16/201,041

(22) Filed: Nov. 27, 2018

(65) Prior Publication Data

US 2020/0167486 A1  May 28, 2020

(51) Int. Cl.
| | |
|---|---|
| *G06F 21/60* | (2013.01) |
| *G06F 13/16* | (2006.01) |
| *G06F 21/62* | (2013.01) |
| *G06F 9/54* | (2006.01) |

(52) U.S. Cl.
CPC ........ *G06F 21/606* (2013.01); *G06F 13/1684* (2013.01); *G06F 21/6218* (2013.01); *G06F 9/54* (2013.01)

(58) Field of Classification Search
CPC .............. G06F 21/606; G06F 21/6218; G06F 13/1684; G06F 9/54
See application file for complete search history.

(56) References Cited

U.S. PATENT DOCUMENTS

| | | | |
|---|---|---|---|
| 4,685,056 A * | 8/1987 | Barnsdale, Jr. ......... | G06F 21/52 340/5.74 |
| 8,601,595 B2 | 12/2013 | Gelvin | |
| 8,751,092 B2 | 6/2014 | Deniau | |
| 8,925,083 B2 | 12/2014 | Niner et al. | |
| 9,477,843 B2 | 10/2016 | Nairn | |
| 9,767,318 B1 * | 9/2017 | Dropps ................... | G06F 21/72 |
| 9,866,563 B2 | 1/2018 | Teshler | |
| 10,310,500 B1 * | 6/2019 | Brady .................. | G05D 1/0027 |
| 10,516,681 B2 | 12/2019 | Ruvio et al. | |
| 2003/0221118 A1 * | 11/2003 | Walker .................. | B60R 25/102 713/193 |
| 2004/0044472 A1 * | 3/2004 | Tsuge ................. | G01C 21/3415 701/414 |
| 2014/0025253 A1 | 1/2014 | Rybak | |
| 2016/0078223 A1 * | 3/2016 | Buer ....................... | G06F 21/76 713/189 |
| 2017/0078398 A1 | 3/2017 | Haidar | |
| 2018/0373866 A1 | 12/2018 | Sweeney et al. | |
| 2019/0171813 A1 * | 6/2019 | Oberman .......... | H04L 12/40013 |

FOREIGN PATENT DOCUMENTS

EP        1780056 A3      3/2011

* cited by examiner

*Primary Examiner* — Sher A Khan
(74) *Attorney, Agent, or Firm* — Schmeiser, Olsen & Watts; Brian M. Restauro (57) ABSTRACT

A system comprises a first computer interface that includes a first plurality of single bit bus lines that communicate with a computer accessory; and a second computer interface that includes a second plurality of single bit bus lines that communicate with a vehicle computer. The second plurality of single bit bus lines are less than the first plurality of single bit bus lines for preventing bits of the data bits that are on a most significant bit (MSB) bus of the first plurality of single bit bus lines from communicating with a region of an address space in a memory of the on-board vehicle computer.

15 Claims, 5 Drawing Sheets

VEHICLE COMPUTER SECURITY

BACKGROUND

The present invention relates to on-board vehicle computers, and more specifically, to systems and methods for protecting vehicle telemetry data.

Modern transportation vehicles ranging from automobiles to airplanes include complex computer systems, which govern nearly every facet of the vehicles' operations. Computer accessories such as smartphones, third-party navigation systems, and in-dash entertainment devices are also complex, and often require access to vehicle telemetry data stored at an onboard computer.

SUMMARY

An embodiment of the present invention relates to a system comprising: a first computer interface that includes a first plurality of single bit bus lines that communicate with a computer accessory; and a second computer interface that includes a second plurality of single bit bus lines that communicate with a vehicle computer, the second plurality of single bit bus lines less than the first plurality of single bit bus lines for preventing bits of the data bits that are on a most significant bit (MSB) bus of the first plurality of single bit bus lines from communicating with, e.g., accessing and/or receiving data from, a region of an address space in a memory of the on-board vehicle computer.

Another embodiment of the present invention relates to a system comprising: a vehicle memory that stores sensitive data in a first address space and non-sensitive data in a second address space; and an accessory security subsystem that receives vehicle data from a first accessory device, provides a first data path between the first accessory device and the vehicle memory, receives vehicle data from a second accessory device, provides a second data path between the second accessory device and the second address space of the vehicle memory, and prohibits the second data path from extending to the first address space.

Another embodiment of the present invention relates to a computer system, comprising: a processor; a memory device coupled to the processor; one or more remote computer servers in communication with the processor; and a computer readable storage device coupled to the processor, wherein the storage device contains program code executable by the processor via the memory device to implement a method for processing an electronic communication, comprising: receiving vehicle data; forming a first data path between a first accessory device and a vehicle memory having a first address space and a second address space; forming a second data path between a second accessory device and the second address space of the vehicle memory, and prohibiting the second data path from extending to the first address space.

DETAILED DESCRIPTION

Modern interfaces between third party electronic vehicle accessories and a vehicle's onboard computer present potential security vulnerabilities, especially those accessories capable of communicating with a computer network. Electronic computing devices may access some telemetric data stored at the vehicle computer, for example, vehicle speed, global positioning system (GPS), fuel consumption, and so on. However, it is desirable to prevent such devices from accessing other data provided with respect to braking systems, fuel recognition, driverless control, and so on. Without proper security, a computer hacker may desire to access the computer of a driverless or autonomous vehicle in an attempt to take control of the vehicle remotely via an internet connection to the vehicle.

One conventional approach for addressing vehicle security vulnerabilities is to isolate functions between disparate computer systems so that the sensitive data is confined to those computer systems which do not accept external connections. For example, a diagnostic port may be available for accessing specific information such as odometer readings. However, this approach is restricted to one-way communication, i.e., from the remote computer to the on-board vehicle computer, and limits the utility of the available data by requiring a separate computer for public telemetry, which in turn limits the application to interactive systems and responsive control systems. Here, interactive systems cannot control non-sensitive vehicle functions like climate control, media playback, mirror adjustment, interior lights, and so on. For example, an in-dash entertainment system would not be able to adjust volume to compensate for road speed and air conditioning noise.

Another conventional approach is to apply commonplace information technology (IT) security software practices to limit access with respect to the vehicle computer such that applications and accessories are provided with information on a "need to know" basis. However, this exposes the vehicle to software vulnerabilities due to improper input validation, buffer overflows, buffer over-reads, and so on. Software defects may also be exposed to remote attacks, for example, by accessing read-protected memory in affected web servers through a flaw in the secure protocol of the memory.

In brief overview, a security subsystem between a vehicle computer and third party, consumer-provided, or non-original equipment manufacturer (OEM) computing devices renders it physically impossible for these computing devices to access or otherwise compromise vehicle computer memory locations where sensitive information is stored. In particular, the security subsystem includes an interface bus that provides a bi-directional transfer of data between private and public computing environments that permit non-sensitive data to be exchanged with insecure and untrusted elements of the vehicle computer, while physically isolating secure elements of the vehicle computer by blocking memory locations corresponding to the secure elements. Accordingly, the security subsystem discriminates between sensitive and non-sensitive data by analyzing vehicle data for both sensitive data that is physically inaccessible to untrusted connected devices and non-sensitive data, and storing the sensitive data in an address space of memory and storing the non-sensitive date in a different address space.

Figure 1:
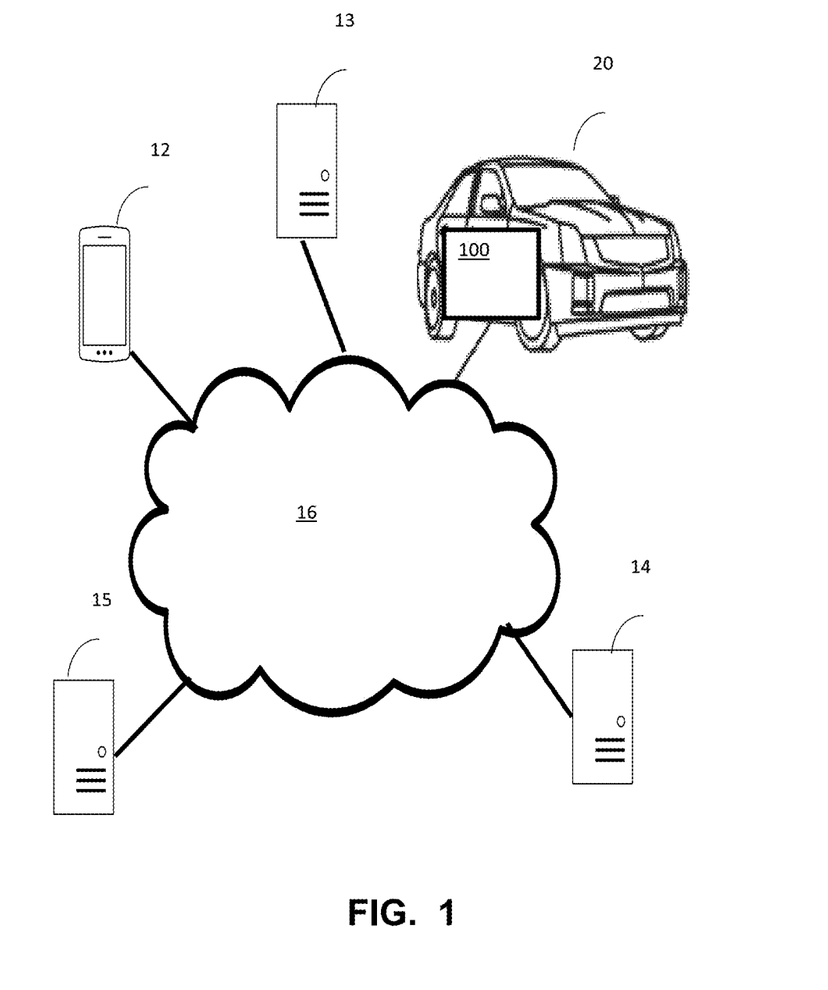
FIG. 1 is a diagram of a computing environment in which a secure vehicle communication system operates, in accordance with embodiments of the present invention.
Figure 2:
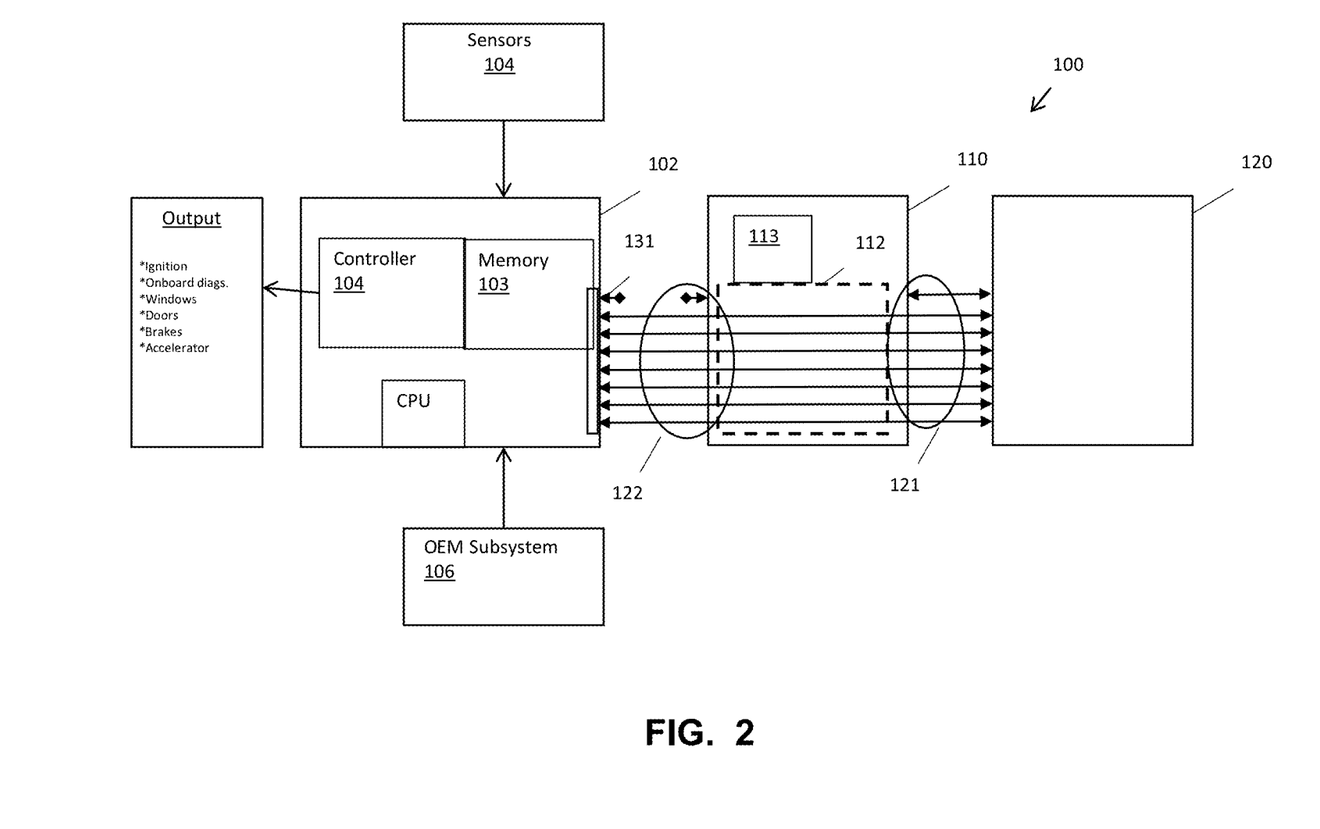
FIG. 2 is a block diagram of an on-board vehicle computer system, in accordance with embodiments of the present invention.

Referring to FIGS. 1 and 2, a secure vehicle communication system 100 exchanges data with one or more of a personal computing device 12 such as a smartphone, laptop computer, and so on, and/or computers of a music source 13, a news source 14, an automobile manufacturer's computer 15, and/or other computers via a communication network 16. Examples of a communication network 16 may include, but are not limited to, a public switched telephone network (PSTN), wireless network such as a cellular network for mobile devices, a GPS network, a data communication network, or a combination thereof. In some embodiments, the vehicle includes a computer having an I/O device such as a network interface for communicating with the network 16, for example, to form a mobile hotspot, WiFi network, or the like so that personal computers inside or near the vehicle 20 can access the network 16 from the vehicle 20.

In some embodiments, as shown in FIG. 2, the secure vehicle communication system 100 includes an on-board vehicle computer 102, also referred to as an in-vehicle computer, and an accessory security subsystem 110.

The vehicle computer 102 may include multiple computers such as electronic control units (ECUs) that control various vehicle systems such as engine, transmission, power windows, doors, and so on. These computers can have or otherwise communicate with sensors and switches, for example, sensors 104 in FIG. 2, configured to detect variables such as temperature, pressure, voltage, acceleration, braking, and so on. The vehicle computer 102 may include an internal network for exchanging data between the sensors and computers of the vehicle.

The accessory security subsystem 110 is configured to exchange data between the on-board vehicle computer 102 and one or more consumer accessory devices 120. The accessory security subsystem 110 provides a secure communication interface between the on-board vehicle computer 102 and consumer accessory devices 120 by including a hardware bus 112, also referred to as an interface bus. The hardware bus 112 includes a plurality of parallel data lines for transporting communications bits in a manner such that the hardware bus 112 presents fewer addressable bits to the accessory devices 120 than exist in the vehicle computer 102. One or more data lines 131 of the vehicle computer 102 does not have a physical connection to a corresponding data line of the accessory security subsystem 110, and therefore, an MSB line is not connected. Any and all restricted elements in the vehicle computer 102 that operate in an a non-addressable memory space only accessible via the MSB line 131 is prevented, and therefore physically isolated from any accessory device 120 coupled to the accessory security subsystem 110. The absence of the MSB line of a critical physical connection prevents any external, non-OEM device from exchange data with, or otherwise requesting and receiving data protected by its location in non-addressable memory space, and therefore, the physical connection cannot expose any sensitive data.

The vehicle computer 102, also referred to as a host system, is constructed and arranged to exchange data via the accessory security subsystem 110 in a secure manner. In doing so, the hardware bus 112 of the accessory security subsystem 110 extends to and is in electronic communication with receiving connectors of the vehicle computer 102. In some embodiments, the bus 112 presents fewer addressable bits to the accessory subsystem 110 than those that exist in the vehicle computer 102. To achieve this, the hardware bus 112 does not include a physical connector, or line, between the accessory subsystem 110 and the on-board vehicle computer 102 that carries the MSB, and therefore access to an upper address space of vehicle computer memory 103 is blocked with respect to data exchanged via the accessory security subsystem 110 with a consumer accessory device 120.

One or more OEM subsystems 106 may provide computerized engine, emissions, transmission, and braking systems, power locks, windows, sliding doors, and so on may communicates with the vehicle computer 102 via electronic interfaces, connectors, application programming interfaces (APIs), and so on. An OEM subsystem 106 does not directly exchange data with the accessory security subsystem 110. The OEM subsystems 106 may include a controller including a microcomputer that communicates with one or more sensors 104. For example, a sensor 104 may detect that a vehicle door is open, whereby the OEM subsystem 106 may operate to prevent the driver from shifting the stationary vehicle out of park or neutral. The vehicle computer 102 may communicate with the vehicle's OEM controller and sensors 104 associated with OEM subsystems. Any auxiliary or non-OEM devices, on the other hand, communicate with the vehicle computer 102 via the accessory security subsystem 110.

In some embodiments, the accessory security subsystem 110 has an insecure interface 121 constructed and arranged to physically interface with the consumer accessory device 120 and a secure interface 122, also referred to as a secure bus, constructed and arranged to physically interface with the on-board vehicle computer 102. A consumer accessory device 120 may electrically couple to the accessory security subsystem 110 via the insecure interface 121 according to well-known or industry standard computer connectors, such as a universal serial bus (USB), Bluetooth, RF, NFC, or the like. Accordingly, the consumer accessory device 120 may be a non-OEM computing device that directly couples with the accessory security subsystem 110 to exchange data with the on-board vehicle computer via the accessory security subsystem 110. In some embodiments, the accessory security subsystem 110 includes wireless transponders in lieu of physical connectors to an accessory device 120. Regardless of interface, the accessory security subsystem 110 includes in some embodiments a protocol translation system 113 that can translate a communication protocol such as SAE J1850, ISO 9141-2, ISO 14230, and IOS 15765 to which the accessory device 120 complies and executes, and is adapted for the secure interface so as to conform with the address space of the secure bus, for example, the secure interface 122 that does not include a physical line for an MSB bit. In configurations where the insecure interface 121 complies with serial protocols such as Bluetooth or USB between the accessory device 120 and the accessory security subsystem 110, the data is buffered at a hardware buffer, and the data bits are mapped and transmitted over the individual bit interfaces of the secure bus 122. In some embodiments, the system includes a special-purpose arrangement of electrical conduits, lines, or the like for performing a mapping operation between the buffer and the interface.

Referring again to the hardware bus 112 of the accessory security subsystem 110, the secure interface 122 is constructed and arranged to communicate with the protocol translation system 113 to perform any translation needed between the protocol of the on-board vehicle computer 102 and its own protocol.

A physical connector interfacing with the accessory devices 120 may vary by manufacturer. Therefore, in some embodiments, a direct memory access (DMA) controller is provided at the secure interface 122 to eliminate the potential for software vulnerabilities while allowing certain hardware subsystems to access permitted regions of the vehicle memory 103. Accordingly, when a request is made via the bus 112, information is read or written directly in the memory space 103 of the on-board vehicle computer 102. However, the protected regions of the memory 103 cannot be accessed since the accessory security subsystem 110 cannot specify address numbers in that range. In some embodiments, the on-board vehicle computer 102 does not operate a compatible protocol, so the accessory security subsystem 110 can perform a protocol translation similar to translations performed for other accessory device interfaces. In some embodiments, this interface is OEM-specific and is configured to prevent all but the OEM from modifying its firmware.

Figure 3:
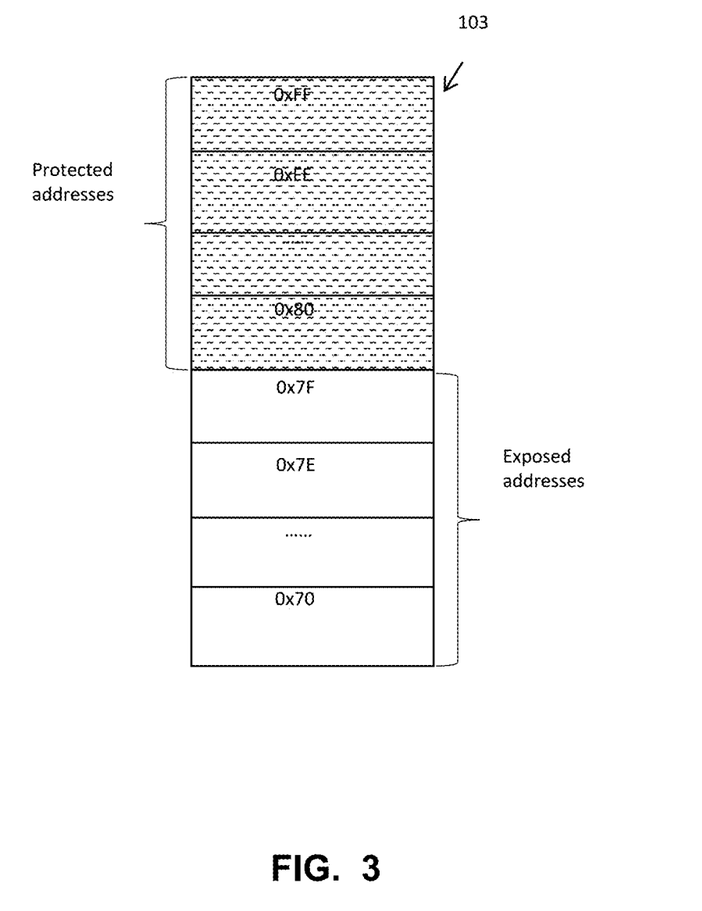
FIG. 3 is a diagram of an address space provided by a vehicle computer system, in accordance with embodiments of the present invention.

As shown in FIG. 3, the on-board vehicle computer 102 provides addressable storage for its storage, memory, routines, and any other addressable resources. The addressable storage can be divided, or segmented, into an upper address space and a lower address space. In some embodiments, all protected resources are configured to the upper address space, and non-sensitive resources are accessible in the lower address space. For example, in a 64 bit address space, the braking subsystem of a vehicle is configured to occupy addresses between 0x8000000000000000 and 0xFFFFFFFFFFFFFFFF, and vehicle GPS data are in an unprotected address space between 0x0000000000000000 and 0x7FFFFFFFFFFFFFFF. Manufacturers will document low-level addresses for all public resources, for example, providing an application programming interface (API) or software developer's kit (SDK) to communicate with the accessory subsystem 110.

Therefore, a typical consumer accessory device 120 such as a smartphone, aftermarket in-dash system, GPS, and so on can communicate with the vehicle computer 102 using manufacturer-provided APIs to gather telemetric data such as speed, mileage, and so on, and to control non-sensitive systems such as radio, climate control, and so on. Any attempts by the accessory device 120 to access resources in the upper address space of memory 103 will be unsuccessful since the MSB cannot be communicated across the accessory subsystem bus 112.

In some embodiments, more than one MSB bus can be blocked, for example where an address space is segmented into a smaller insecure space and a larger secure space, instead of equally-sized secure and insecure spaces.

Figure 4:
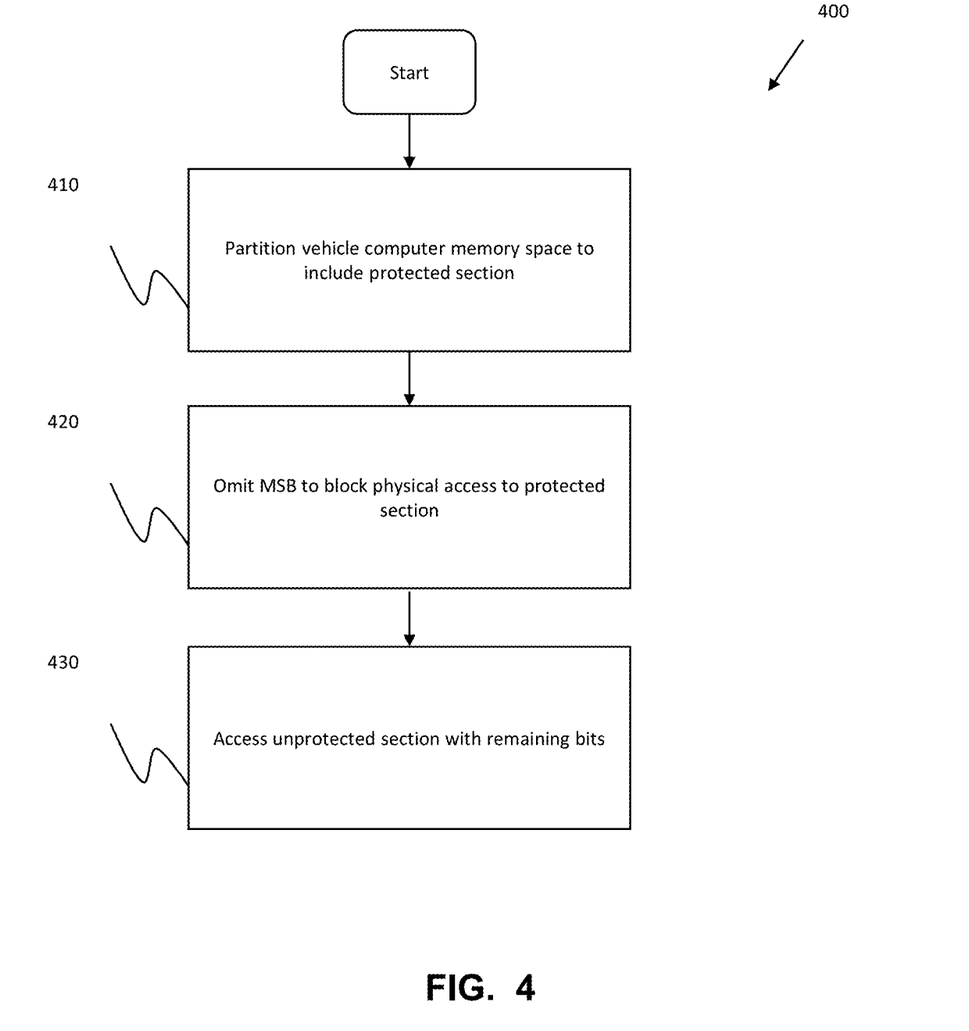
FIG. 4 is a flow diagram of a method for secure communication between an on-board vehicle computer and a consumer accessory device, in accordance with embodiments of the present invention.

FIG. 4 is a flow diagram of a method 400 for secure communication between an on-board vehicle computer and a consumer accessory device, in accordance with embodiments of the present invention. In describing the method 400, reference is made to elements of FIGS. 1-3.

At block 410, a vehicle computer memory space 103 is partitioned or otherwise constructed and arranged to include a protected section, for example, including addresses shown in FIG. 3 that cannot be accessed, except by OEM subsystems 106 and/or other pre-approved electronic devices.

At block 420, the MSB bus of a parallel array of single-bit busses is omitted, severed, or otherwise omitted, thereby blocking access to the upper address space of the memory 103 for the insecure interface of the accessory subsystem.

At block 430, unprotected sections of the memory 103 are accessible to consumer accessory devices 120 due to the lower bits, or remaining address lines absent the MSB line, needed to represent the addresses of the lower address space and allowing the respective data to be accessed.

Figure 5:
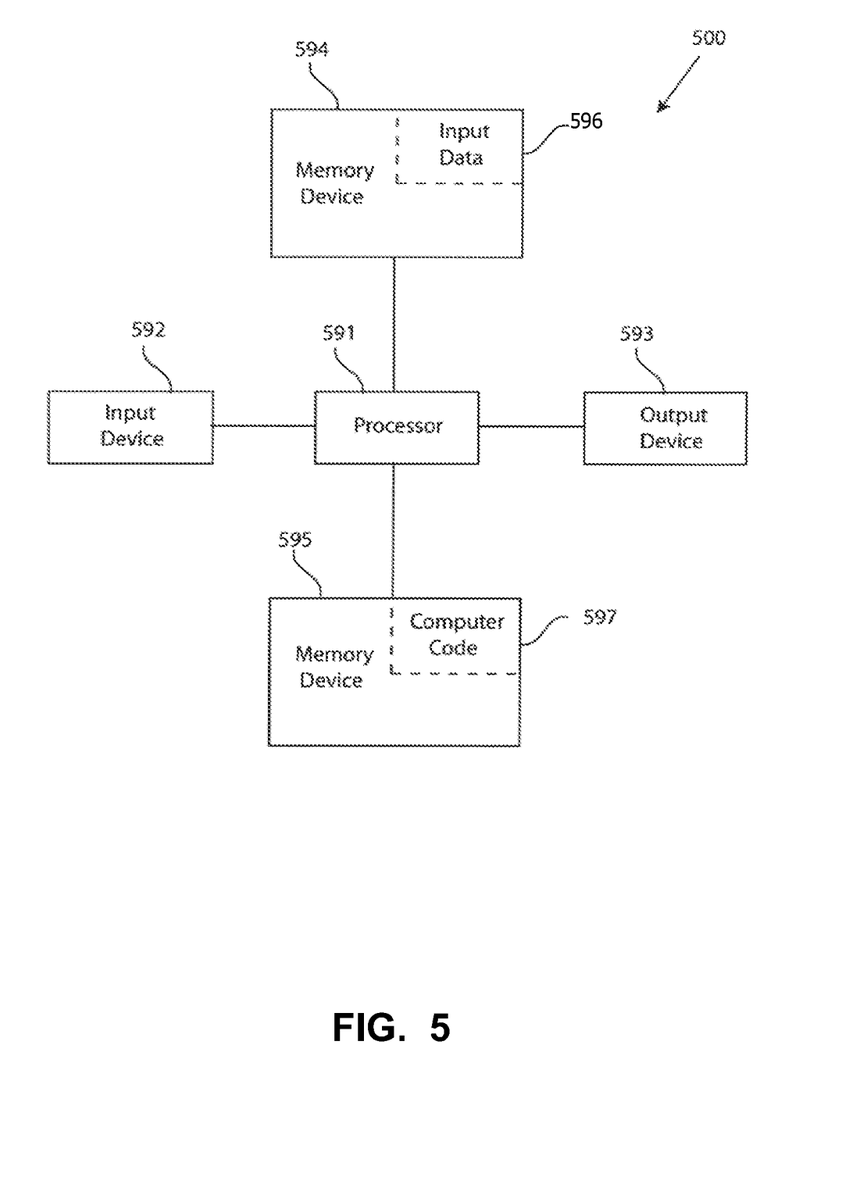
FIG. 5 illustrates a block diagram of a computer system, in accordance with embodiments of the present invention.

FIG. 5 illustrates a block diagram of a computer system 500 that may be included in the systems and methods described with respect to FIGS. 1-4 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method, in the manner prescribed by one or more elements of the system and methods described with respect to FIGS. 1-4, wherein the instructions of the computer code 597 may be executed by processor 591 via memory device 595. The computer code 597 may include software or program instructions that may implement one or more algorithms for implementing the methods of providing a result, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository, for example, part of one or more elements of the computing architecture as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to cognitive computer systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of vehicle computer security according to some embodiments of the invention. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for vehicle computer security.

A computer program product of the present invention comprises [OB] one or more processors of a computer system to implement the methods of the present invention.

A computer system of the present invention comprises [OB] one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a hardware processor or memory;
   a first computer interface that includes a first plurality of single bit bus lines that communicate with a computer accessory;
   a second computer interface that includes a second plurality of single bit bus lines that communicate with a vehicle computer for exchanging a plurality of data bits between the first and second computer interfaces, the second plurality of single bit bus lines less than the first plurality of single bit bus lines for preventing bits of the data bits that are on a most significant bit (MSB) bus of the first plurality of single bit bus lines from communicating with a region of an address space in a memory of the on-board vehicle computer, and
   a hardware bus including a plurality of parallel data lines for exchanging data bits between the first and second computer interfaces, wherein the hardware bus includes a physical gap between the MSB bus of the first computer interface and the second computer interface to prevent the MSB bus from exchanging data with the memory of the on-board vehicle computer.

2. The system of claim 1, wherein the plurality of parallel data lines is equal to the second plurality of single bit bus lines of the second computer interface.

3. The system of claim 1, wherein includes the hardware bus provides a bi-directional transfer of data permit non-sensitive data to be exchanged with insecure and untrusted elements of the vehicle computer, and physically isolates secure elements of the vehicle computer by blocking memory locations of the address space corresponding to the secure elements.

4. The system of claim 1, further comprising a protocol translation system that translates a communication protocol to which the computer accessory complies so that the computer accessory communicates with the address space except for the region of an address space having memory locations storing sensitive data.

5. The system of claim 4, wherein the protocol translation system communicates with the second computer interface perform a translation between a communication protocol of the on-board vehicle computer and a protocol of the protocol translation system.

6. The system of claim 1, wherein the first computer interface complies with a serial protocol providing a data communication between the accessory device and the first computer interface, wherein the first computer interface comprises a hardware buffer, and where in the system further comprises a mapping apparatus that maps and transmits the data bits over the individual bit interfaces of the second computer interface.

7. A system, comprising:
   a vehicle memory that stores sensitive data in a first address space and non-sensitive data in a second address space; and
   an accessory security subsystem that receives vehicle data from a first accessory device, provides a first data path between the first accessory device and the vehicle memory, receives vehicle data from a second accessory device, provides a second data path between the second accessory device and the second address space of the vehicle memory, and prohibits the second data path from extending to the first address space, wherein the second data path extends along a hardware bus including a plurality of parallel data lines for exchanging data bits between a first computer interface that communicates with a computer accessory and a second computer interface that communicates with the second address space of the vehicle memory, wherein the plurality of parallel data lines is equal to a plurality of single bit bus lines of the second computer interface and less than a plurality of single bit bus lines of the first computer interface, and wherein a most significant bit (MSB) bus of the first computer interface terminates at a gap between the MSB bus and second computer interface to prevent the bits of the data bits that are on the MSB bus from communicating with the vehicle memory.

8. The system of claim 7, wherein the accessory security subsystem includes an insecure interface constructed and arranged to physically interface with the second accessory device and a secure interface constructed and arranged to communicate with the vehicle memory.

9. The system of claim 8, wherein the first accessory device includes an interface constructed and arranged to communicate with either the first address space or the second address space.

10. The system of claim 8, further comprising a hardware bus including a plurality of parallel data lines for exchanging data bits between the secure interface and the insecure interface.

11. The system of claim 7, wherein the first accessory device includes an original equipment manufacturer (OEM) subsystem and the second accessory device includes a non-OEM subsystem.

12. The system of claim 11, wherein the OEM subsystem includes an application programming interface (API) to provide the vehicle data to the first data path.

13. The system of claim 7, wherein the first address space includes an upper address space and the second address space includes a lower address space, and wherein protected resources are configured to the upper address space, and non-sensitive resources are accessible in the lower address space.

14. A computer system, comprising:
  a processor;
  a memory device coupled to the processor;
  one or more remote computer servers in communication with the processor; and
  a computer readable storage device coupled to the processor, wherein the storage device contains program code executable by the processor via the memory device to implement a method for processing an electronic communication, comprising:
  receiving vehicle data;
  forming a first data path between a first accessory device and a vehicle memory having a first address space and a second address space;
  forming a second data path between a second accessory device and the second address space of the vehicle memory; and
  prohibiting the second data path from extending to the first address space, wherein the second data path extends along a hardware bus including a plurality of parallel data lines for exchanging data bits between a first computer interface that communicates with a computer accessory and a second computer interface that communicates with the second address space of the vehicle memory, wherein the plurality of parallel data lines is equal to a plurality of single bit bus lines of the second computer interface and less than a plurality of single bit bus lines of the first computer interface, and wherein a most significant bit (MSB) bus of the first computer interface terminates at a gap between the MSB bus and second computer interface to prevent the bits of the data bits that are on the MSB bus from communicating with the vehicle memory.

15. The computer system of claim 14, further comprising providing a bi-directional transfer of data permit non-sensitive data to be exchanged with insecure and untrusted elements of the vehicle memory, and physically isolates secure elements of the vehicle memory by blocking memory locations of the upper address space corresponding to the secure elements.

* * * * *